Feb. 15, 1938.   H. H. HOLMES   2,108,312

VALVE

Filed March 10, 1936

INVENTOR
Harold H. Holmes
John A. Naismith
ATTORNEY

Patented Feb. 15, 1938

2,108,312

UNITED STATES PATENT OFFICE 2,108,312

VALVE

Harold H. Holmes, San Jose, Calif.

Application March 10, 1936, Serial No. 68,034

6 Claims. (Cl. 251—144)

The present invention relates particularly to a valve for controlling the flow of oil to an oil burner, but may be readily applied to the control of fluids in general when constrained to flow through conduits.

When feeding fuel oil to a burner it is highly desirable, of course, that an even uniform flow be maintained at all times. When the oil is being delivered to the burner in the usual manner, that is, by pumping it from a source of supply, there are many factors tending to interfere with this desired even flow. Among them may be mentioned the variations in viscosity due to varying temperatures, and variations in pump pressure.

It is the object of the present invention to provide a valve constructed and arranged to automatically adjust itself to variations in pressure in the fluid received and discharge the fluid at a uniform pressure.

It is another object of the invention to provide a valve of the character indicated that may be adjusted to establish a fixed uniform rate of flow of the medium passing therethrough regardless of changes in the viscosity of the said medium.

It is also an object of the invention to provide a device of the character indicated that will be economical to manufacture, simple in form and construction, that consists of few parts, that will not clog or chatter, and that is small, compact, and highly efficient in its practical application.

Figure 2:
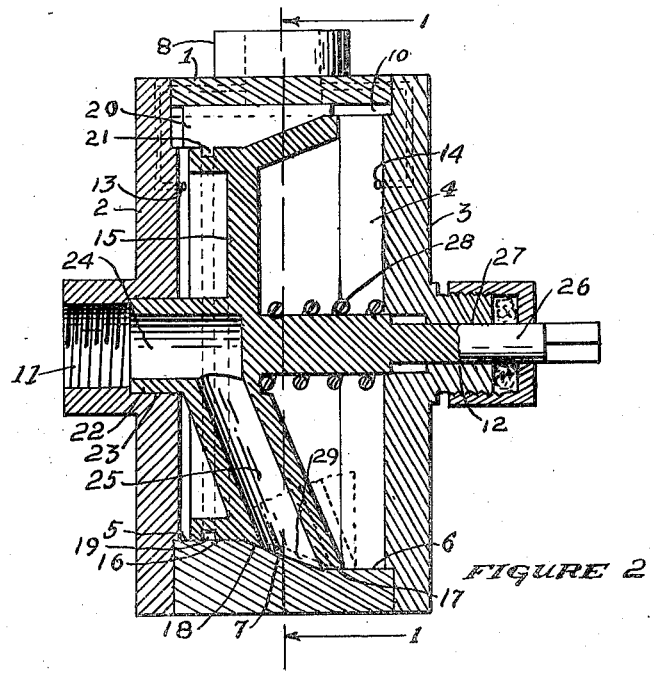
Figure 2 is a sectional view on line 2—2 of Figure 1.
Figure 1:
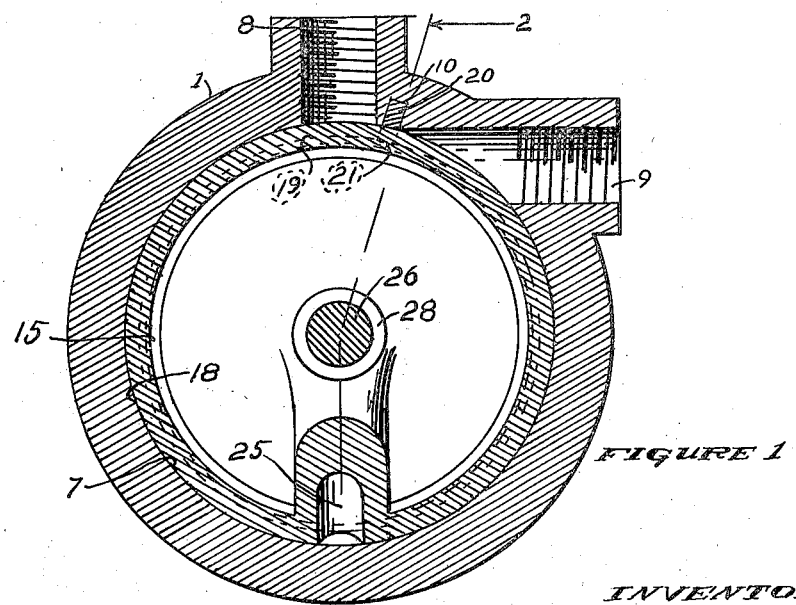
Figure 1 is a sectional view through a valve embodying my invention as on line 1—1 of Figure 2.

In the embodiment of the invention herein disclosed I show at 1 an annular member having plates as 2 and 3 mounted on its two sides to form or define a chamber 4.

The member 1 has an annular surface of given diameter formed on its inner periphery adjacent plate 2 as shown at 5, and a second annular surface of greater diameter formed on its inner periphery adjacent plate 3 as shown at 6, the two surfaces 5 and 6 being connected by an inclined annular surface 7.

Member 1 is also provided with two discharge ports 8 and 9 disposed in close relation to each other, port 8 providing an overflow outlet and port 9 discharging to the line leading to the burner. A channel or guideway 10 is formed on the inside of member 1 between ports 8 and 9 and parallels the axis of the chamber 4.

Axially disposed in the plate 2 is an inlet port 11 to which the feed line from the pump is connected, and opposite this port in plate 3 is formed a bearing 12.

The housing formed by parts 1, 2, and 3 has ducts as 13 and 14 formed therein leading from opposite sides of the chamber 4 to port 8.

At 15 is shown an annular valve member slidably and rotatably mounted in chamber 4, its peripheral surface having a part as at 16 adapted to engage surface 5, a part 17 to engage surface 6, and a part 18 to engage surface 7.

An annular groove 19 is formed in member 15 in opposed relation to surface 5. At 20 is a separator element slidably mounted in the channel 10 and having its inner edge conforming to and seating against the surfaces 16, 17, 18 of member 15. Element 20 is provided with an inwardly projecting finger 21 engaging the groove 19 in member 15, whereby member 15 may be rotated independently of the element but will carry the element with it when moved axially.

Member 15 is provided with a hub portion 22 slidably engaging port 11 at 23 and having a conduit or passage 24 formed therein communicating with said port and leading laterally through the body of the member as at 25 where it is closed by the surface 7 on member 1 when the valve is inoperative. A spindle 26 on member 15 is slidably and rotatably mounted in bearing 12 as at 27, and a spring 28 is mounted thereon to urge member 15 toward the inlet port 11.

When the device is constructed as described and no oil is being pumped through port 11, the several parts are in the position shown, but when oil is pumped into the passage 24 under pressure the member 15 backs away against the resistance of spring 28 and oil flows through passage 25 into the annular passage 29 then formed as indicated by the dotted-line position of the valve member in Figure 2. Any variation in the oil pressure is compensated for by a corresponding increase or decrease in the size of passage 29 so that the output through the valve is constant in volume.

Since the passage 25 is in member 15 it follows that the member 15 may be rotated to place the discharge end of the passage at any desired annular distance from the outlet port 9, and since this passage is closed off by the separator element 20 between ports 8 and 9 the oil must flow in opposite directions from passage 25 to the two ports 8 and 9. The position of passage 25 therefore determines the volume of oil permitted to flow through port 9 because a shortening of passage 29 on one side of passage 25 effects a corresponding lengthening of the passage on the other side of passage 25.

When the passage 25 is adjusted to effect the desired discharge through port 9 the overflow passes around in the opposite direction to port 8, and this proportional division of the oil is constant regardless of its viscosity.

Oil collecting in chamber 4 on either side of member 15 may pass out through ducts 13—14 to overflow port 8, thereby preventing locking of member 15.

Chattering is entirely eliminated in this valve because there is always a film of oil between the member 15 and its seat, and there are no small passages to become clogged and require cleaning. The valve may be made into a relief valve only by closing a port as 9 and removing 20.

It is to be understood, of course, that while I have herein shown and described but one specific embodiment of the invention, changes in form, construction, and method of assembly and operation may be made within the scope of the appended claims.

I claim:

1. A valve of the character described comprising, a housing forming a cylindrical chamber with juxtapositioned ports leading therefrom, a valve member mounted for rectilinear and rotational movement therein and cooperative with the housing to form a passage communicating with said ports, separator means for the passage between said ports supported against rotational movement with the member but having rectilinear movement therewith, and an inlet passage leading through the housing and member to communication with said first passage when formed.

2. A valve of the character described comprising, a housing forming a cylindrical chamber with juxtapositioned ports leading therefrom, a valve member mounted for rectilinear and rotational movement therein, the housing and member having cooperating surfaces disposed in both angular and parallel relation to the housing axis to form a passage therebetween when the member is moved axially, separator means for the passage between said ports, and an inlet passage leading through the housing and member to said first passage when formed.

3. A valve of the character described comprising, a housing forming a cylindrical chamber and having juxtapositioned ports leading therefrom, a valve member seated in said chamber to normally close said ports but movable with respect thereto to form an annular passage connecting said ports, a passage leading through the housing and member to said first pasage when formed, and separator means disposed to permanently close off the first passage when formed between said ports, the member being rotatable in the chamber whereby to proportionally vary the length of the first passage when formed on either side of the second passage.

4. A valve of the character described comprising, a housing forming a cylindrical chamber, a valve member mounted for rotational and rectilinear movement therein, said chamber and member having opposing annular surfaces of different diameters with angular connecting surfaces whereby rectilinear movement of the member will form a passage between the housing and member, the housing having juxtapositioned ports formed therein leading from said passage when formed, a passage leading through the housing and member to said first passage when formed, and separator means permanently closing the first passage when formed between said ports.

5. A valve of the character described comprising, a housing forming a cylindrical chamber, a resiliently supported valve member mounted for rotational and rectilinear movement therein, said chamber and member having opposing annular surfaces of different diameters with angular connecting surfaces whereby rectilinear movement of the member against its resilient support will form a passage between the housing and member, the housing having juxtapositioned ports formed therein leading from said passage when formed, a passage leading through the housing and member to said first passage when formed, and separator means permanently closing the first passage when formed between said ports.

6. A valve of the character described comprising, a housing, a valve member mounted for axial movement therein, the housing and member having cooperating surfaces disposed in both angular and parallel relation to the housing axis whereby to form a passage therebetween when the valve member is moved axially, and passages leading to the passage so formed through both the housing and the valve member, and having direct communication with the angularly disposed surfaces in offset relation to each other.

HAROLD H. HOLMES.